United States Patent Office  3,702,887
Patented Nov. 14, 1972

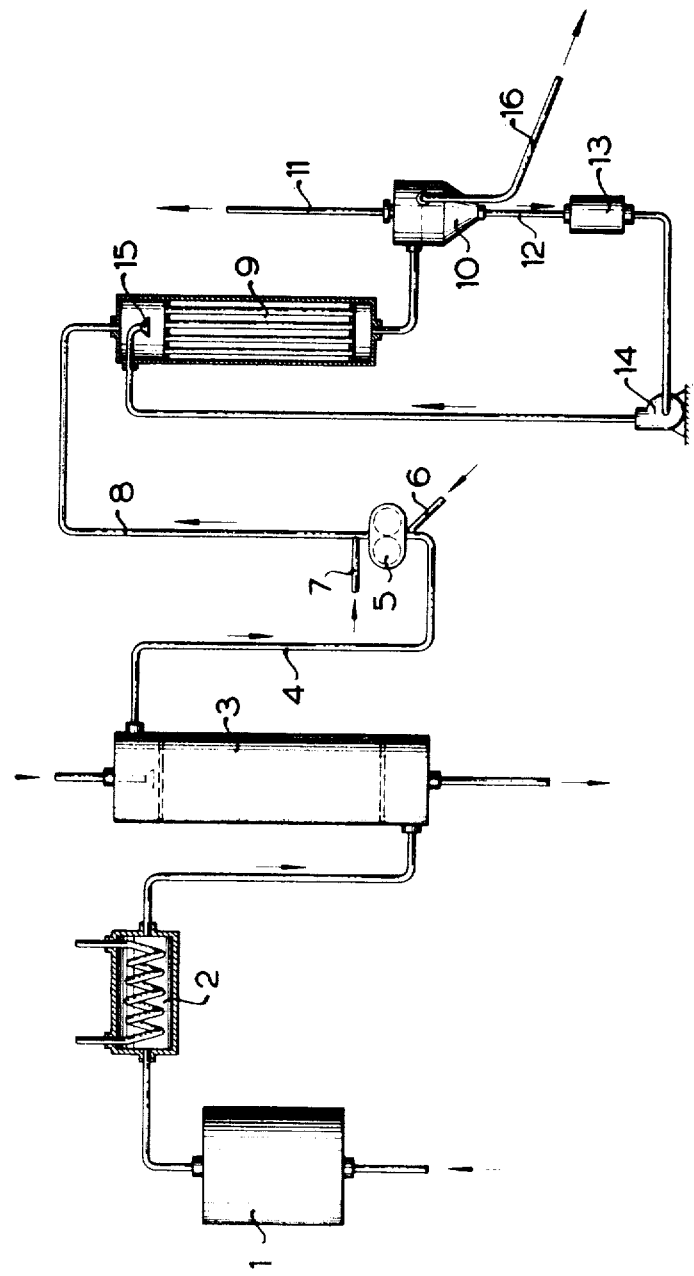

3,702,887
PROCESS FOR THE MANUFACTURE OF HYDROGEN CYANIDE FROM FORMAMIDE
Kurt Sennewald, Hermulheim, near Cologne, Rudolf Wesselmann and Ernst Holler, Knapsack, near Cologne, and Heinz Muller, Bruhl, Germany, assignors to Knapsack Aktiengesellschaft, Knapsack, near Cologne, Germany
Filed Dec. 4, 1970, Ser. No. 95,211
Claims priority, application Germany, Dec. 8, 1969,
P 19 61 484.7
Int. Cl. C01c 3/02; F25j 3/00
U.S. Cl. 423—373                                3 Claims

ABSTRACT OF THE DISCLOSURE

Improved production of aqueous hydrocyanic acid by subjecting formamide to a cleavage reaction under reduced pressure and at elevated temperatures, wherein the hydrocyanic acid-containing cleavage gas, which is freed from ammonia and cooled, is compressed substantially to atmospheric pressure and liquefied. The compressed cleavage gas is more particularly liquefied in one or more condensers, which are arranged in upright position and series-connected together; the resulting aqueous hydrocyanic acid is collected in one or more condensers; a portion of hydrocyanic acid is continuously removed therefrom, recycled to the head of the condenser(s) and sprayed thereinto.

---

German published specification 1,211,612 describes the production of hydrogen cyanide by the so-called formamide-vacuum process, wherein formamide is evaporated under a pressure of between about 10 and 150 mm. Hg and, while supplying heat, catalytically split, predominantly in accordance with the equation:

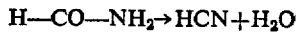
H—CO—NH$_2$ → HCN + H$_2$O into hydrocyanic acid and water. A side reaction, which occurs in accordance with the equation:

H—CO—NH$_2$ → NH$_3$ + CO produces a minor proportion of ammonia, which is removed by scrubbing the cleavage gas with an acid. The cleavage gas is successively compressed substantially to atmospheric pressure and partially liquefied by treating it at low temperatures. It has also been suggested that pumps having mechanically actuated parts, such as reciprocating compressors, helical compressors or water ring pumps or steam ejectors be used to establish the necessary vacuum.

Steam ejectors and water ring pumps are, however, not fully satisfactory and find limited use only in industry because of high steam consumption rates and the need to free large quantities of waste water from traces of hydrogen cyanide. Compressors having mechanically actuated parts are also not fully satisfactory bearing in mind that compresed hydrocyanic acid strongly tends to polymerize near the delivery sides of such apparatus, whereby the production is considerably disorganized, unless steps are taken to avoid polymerization. This may be done, for example, by adding a suitable stabilizer, for example a mineral acid preferably gaseous hydrogen chloride to the compressed cleavage gas having hydrogen cyanide therein.

It is further reported in German published specification 1,211,612 that it is merely necessary to maintain certain temperatures—a range of between 90 and 130° C. has been disclosed—so as to practically avoid polymerization. Attempts have been made earlier to maintain the hydrogen cyanide at temperatures as low as possible since high temperatures have long been held to favor the polymerization of hydrogen cyanide.

Despite all steps suggested heretofore, difficulties are encountered on subjecting crude hydrocyanic acid to finishing treatment, for example in a liquefier, due to the occurrence of polymerization phenomena in the condensers. Considerable corrosion also occurs in those cases in which the condensers made up of chrome-nickel steel are open to the attack of the mineral acid stabilizer which is injected thereinto.

We have now discovered that the difficulties reported above do not appear provided that the condensers are arranged in upright position and hydrogen cyanide in vapor form is conveyed through the tubular structures. By withdrawing a portion of hydrocyanic acid condensate from a collector downstream of the condenser, conveying the condensate to a pump, which delivers the condensate back to the head of the condenser, and distributing the condensate across the upper tubular tray by means of a nozzle, it is possible uniformly to distribute the mineral acid injected into the gas line and thereby extensively to avoid polymerization of hydrocyanic acid in the condensation system. The conduit running to the pump should conveniently be fitted with suitable filters and these cleansed at regular intervals to ensure the removal of minor polymer proportions, which are obtained after all.

The process of the present invention has considerable beneficial effects in all those cases in which the condensers are chrome-nickel steel condensers and hydrogen chloride is the stabilizer. It is known that chrome-nickel steel fails to be hydrogen chloride-proof. Condensers made up of chrome-nickel steel have more particularly a very limited service life in those cases in which the formation of pockets of highly concentrated acid cannot be avoided. This however is substantially avoided by the present invention. Only minor corrosion has been found to occur, even after operation for years, in condensers which are made up of chrome-nickel steel, arranged and fitted with the structural elements in accordance with the present invention. Production stoppages such as those occasioned by polymerization, are definitely avoided in the present invention. In view of this, it is possible to replace condensers of chrome-nickel steel by condensers made up of acid-proof construction material, for example tamped carbon, which could not be used heretofore because of the risk of breakage during the necessary cleansing operations.

It has also been discovered that it may be advantageous for the cleavage gas to be maintained at temperatures higher than those reported in German published specification 1,211,612.

The tendency of hydrocyanic acid to polymerize is obviously not only a function of the temperature prevailing in or downstream of the compressor. It is also and pre-eminently a function of the composition of the cleavage gas, particularly of the water present therein.

For a concentration of about 20 percent by volume steam, for example, in the cleavage gas, it is advantageous to establish a temperature of between 150 and 200° C. in the compressing means and—by the selection of appropriate steps, e.g. heat insulation—to maintain or substantially maintain this temperature range in the conduits connecting the compressing means to the condenser.

It is possible in this manner to prevent the temperature prevailing in the gas line from falling below the dew point and thereby to avoid the formation of ammonia, which may derive from the hydrolysis of hydrocyanic acid with condensed steam and which is known to initiate the polymerization of hydrocyanic acid.

The process of the present invention for the manufacture of aqueous hydrocyanic acid by subjecting formamide to a cleavage reaction under reduced pressure and at elevated temperatures with the use of compressors having mechanically actuated parts for the generation of reduced pressure, wherein the hydrocyanic acid-containing cleavage gas, which is freed from ammonia and cooled, is compressed substantially at atmospheric pressure and liquefied, comprises more particularly liquefying the compressed cleavage gas in one or more condensers, which are arranged in upright position and series-connected together; collecting the resulting aqueous hydrocyanic acid in one or more separators; continuously removing a portion of hydrocyanic acid therefrom; repumping and recycling the said hydrocyanic acid portion to the head of the condenser(s) and spraying it thereinto.

Further preferred features of the present process provide:

(a) For the hydrocyanic acid-containing cleavage gas to be compressed at temperatures of between 150 and 200° C., preferably 160 and 180° C., and for these temperatures to be maintained in the gas lines connecting the compressing means to the condenser(s);

(b) For the compressed hydrocyanic acid-containing cleavage gas to contain between 15 and 25 percent by volume of steam;

(c) For the pump-circulated proportion of hydrocyanic acid, to be purified by filtration;

(d) For the proportion of aqueous hydrocyanic acid, which is continuously withdrawn from the separtor(s) and repumped to the head of the condenser(s), to be used at a rate of between about 3 and 5 percent by volume, based on the aqeuous hydrocyanic acid delivered per hour to the separator;

(e) For the said 3 to 5 percent by volume proportion of aqueous hydrocyanic acid delivered per hour to the separator, to be repumped 40 to 120 times, preferably 50 to 90 times, per hour, and recycled from the separator to the head of the condenser.

An exemplary mode of executing the process of the present invention will now be described with reference to the accompanying drawing:

Formamide was delivered to furnace 1 and split therein into hydrocyanic acid and water, under a pressure of between 80 and 100 mm. Hg and at temperatures of between 400 and 450° C. The cleavage gas was cooled in cooler 2 down to substantially 25° C. and freed from ammonia, which was simultaneously obtained, in scrubbing tower 3 sprayed with sulfuric acid. The purified cleavage gas was delivered through conduit 4 to the suction side of a helical compressor 5, in which it was compressed to a pressure slightly above 1 atmosphere absoute. A portion of the compression heat set free was dissipated by the injection of water through injector 6 into compressor 5. The water was injected at a rate which ensured complete evaporation thereof and a temperature of between 150 and 200° C. for the cleavage gas issuing from the compressor. A gaseous stabilizer, for example hydrogen chloride, was injected through injector 7 placed immediately downstream of the compressor.

The compressed gas, which contained hydrogen cyanide and steam together with substantially 2 percent by volume of inert gases (CO, $CO_2$, $H_2$, air) was delivered to condenser 9 via conduit 8 which was heated and heat-insulated, to avoid loss of heat. The gas travelled downwardly through the tubular structures in the condenser and was cooled thereby down to temperatures of between 30 and 35° C.

In separator 10, the condensed aqueous hydrocyanic acid was isolated from residual cleavage gas, and the latter was delivered through conduit 11 to further condensers and liquefied therein.

A portion of liquefied aqueous hydrocyanic acid having a strength of between about 50 and 60 weight percent was taken from separator 10 by means of suction pump 14 and through conduit 12 and filter 13, and sprayed by means of nozzle 15 onto the head of condenser 9 so as to thoroughly rinse the upper tubular tray thereof. The quantity necessary to achieve this depends on the construction of the condenser. Between about 3 and 5 percent by volume of the aqueous hydrocyanic acid delivered per hour to separator 10 was needed in the present case. This minor proportion was, however, circulated about 90 times per hour through the cycle defined by reference numerals 10, 12, 13, 14, 15, 10. Separator 10 was constructed so as to always contain a stock of hydrocyanic acid for circulation. Aqueous hydrocyanic acid in excess ran off freely through conduit 16 (fitted with an immersion tube) and was put to further use.

The apparatus described above was operated for years in the absence of particular difficulties. It was merely necessary occasionally to clean filter 13 and free it from minor amounts of polymers which were still found to have been formed.

We claim:

1. A process for the manufacture of aqueous hydrocyanic acid by subjecting formamide to a cleavage reaction under reduced pressure and at elevated temperatures, which comprises compressing hydrocyanic acid-containing cleavage gas, which is freed from ammonia and cooled, substantially to atmospheric pressure at temperatures of between 150 and 200° C. and liquifying the compressed cleavage gas containing hydrogen cyanide together with between 15 and 25 percent by volume of steam and a gaseous mineral acid stabilizer in one or more condensers, which are arranged in upright position and series-connected together; maintaining the said temperatures in the gas lines, which connect the compressing means to the condenser(s); collecting the resulting aqueous hydrocyanic acid in one or more separators; continuously removing therefrom a portion of between about 3 and 5 percent by volume of hydrocyanic acid, based on the aqueous hydrocyanic acid delivered per hour to the separator; repumping and recycling the said hydrocyanic acid portion 40 to 120 times, per hour, to the head of the condenser(s) and spraying it thereinto.

2. The process as claimed in claim 1, wherein the temperatures lie between 160 and 180° C.

3. The process as claimed in claim 1, wherein the proportion of aqueous hydrocyanic acid circulated by pumping is purified by filtration.

References Cited
UNITED STATES PATENTS

| | | | |
|---|---|---|---|
| 2,543,971 | 3/1951 | Houpt et al. | 23—151 |
| 2,604,380 | 7/1952 | Beekhuis | 23—151 |

FOREIGN PATENTS

| | | | |
|---|---|---|---|
| 1,211,612 | 3/1966 | Germany | 23—151 |

EARL C. THOMAS, Primary Examiner

H. S. MILLER, Assistant Examiner

U.S. Cl. X.R.

62—20